(12) United States Patent
Miyake et al.

(10) Patent No.: US 7,026,742 B2
(45) Date of Patent: Apr. 11, 2006

(54) STATOR MOUNTING FOR A DOUBLE ROTOR ELECTRIC MOTOR

(75) Inventors: Shuzo Miyake, Kanagawa (JP);
Yoshiyuki Sakashita, Yokohama (JP);
Masaki Nakano, Yokohama (JP);
Masahiro Kosaka, Yokohama (JP);
Minoru Arimitsu, Kanagawa (JP);
Toshikazu Oshidari, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 198 days.

(21) Appl. No.: 10/476,173

(22) PCT Filed: Mar. 28, 2003

(86) PCT No.: PCT/JP03/03923
§ 371 (c)(1),
(2), (4) Date: Nov. 3, 2003

(87) PCT Pub. No.: WO03/084025
PCT Pub. Date: Oct. 9, 2003

(65) Prior Publication Data
US 2004/0135461 A1 Jul. 15, 2004

(30) Foreign Application Priority Data
Apr. 1, 2002 (JP) .............................. 2002-098257
Apr. 1, 2002 (JP) .............................. 2002-098263
Jul. 31, 2002 (JP) .............................. 2002-222606
Dec. 16, 2002 (JP) .............................. 2002-364058

(51) Int. Cl.
*H02K 16/02* (2006.01)
*H02K 1/14* (2006.01)

(52) U.S. Cl. ........................ 310/266; 310/114; 310/217

(58) Field of Classification Search ........ 310/216–218, 310/259, 266, 51, 114, 112
See application file for complete search history.

(56) References Cited

U.S. PATENT DOCUMENTS

| | | | | |
|---|---|---|---|---|
| 3,428,842 A | * | 2/1969 | Harris | 310/217 |
| 3,447,010 A | | 5/1969 | Vreeland | 310/217 |
| 3,476,960 A | * | 11/1969 | Rees | 310/50 |
| 3,693,035 A | * | 9/1972 | Ostwald | 310/51 |
| 3,829,720 A | * | 8/1974 | Swanke et al. | 310/43 |
| 4,765,054 A | * | 8/1988 | Sauerwein et al. | 29/596 |
| 4,864,176 A | | 9/1989 | Miller et al. | 310/194 |
| 6,624,545 B1 | * | 9/2003 | Furuse | 310/217 |

(Continued)

FOREIGN PATENT DOCUMENTS

EP 1 122 859 A2 8/2001

(Continued)

*Primary Examiner*—Karl Tamai
(74) *Attorney, Agent, or Firm*—Foley & Lardner LLP

(57) ABSTRACT

A rotary electric motor is provided which comprises an annular first rotor, an annular stator disposed concentric with and radially outside the first rotor, and an annular second rotor disposed concentric with and radially outside the stator, the stator including a stator core made up of a plurality of stator pieces that are arranged in a circular array and electrically independently from each other, coils wound around the respective stator pieces, annular first and second brackets disposed on opposite axial ends of the stator core, a fastening device passing through holes of the first and second brackets and fixedly holding the stator core between the first and second brackets, and an induction current suppressing device suppressing an induction current that is produced in response to a variation of magnetic flux of each of the coils and flows through the fastening device.

8 Claims, 10 Drawing Sheets

U.S. PATENT DOCUMENTS

| | | | |
|---|---|---|---|
| 6,741,010 B1 * | 5/2004 | Wilkin | 310/268 |
| 6,847,137 B1 * | 1/2005 | Furuse | 310/59 |
| 2004/0135461 A1 * | 7/2004 | Miyake et al. | 310/258 |

FOREIGN PATENT DOCUMENTS

| EP | 1 164 688 A2 | | 12/2001 |
|---|---|---|---|
| JP | 53-086404 | * | 7/1978 |
| JP | 59-041134 A | | 3/1984 |
| JP | 62-014965 U | | 1/1987 |
| JP | 62-18939 A | | 1/1987 |
| JP | 08-098439 A | | 4/1996 |
| JP | 11-26655 A | | 9/1999 |
| JP | 11-341757 | * | 12/1999 |
| JP | 2000-139042 A | | 5/2000 |
| JP | 2001-78408 A | | 3/2001 |
| JP | 2001-359256 A | | 12/2001 |

* cited by examiner

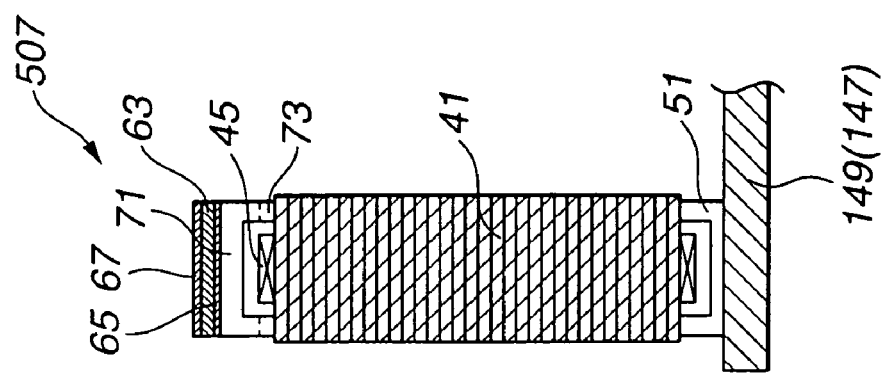
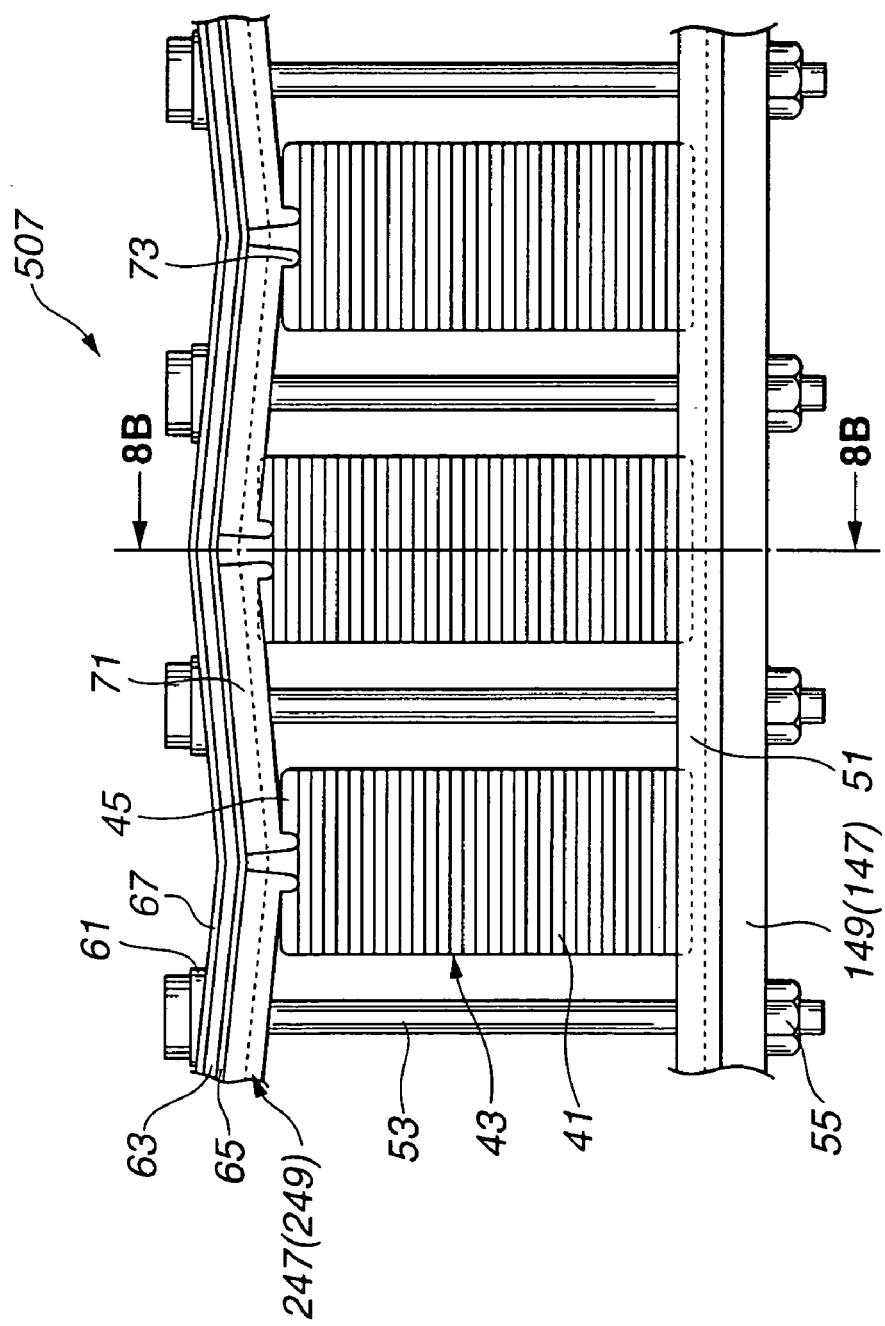

STATOR MOUNTING FOR A DOUBLE ROTOR ELECTRIC MOTOR

BACKGROUND OF THE INVENTION

The present invention relates to a rotary electric motor, particularly of the kind having two concentric rotors driven by one stator disposed concentrically therebetween. More specifically, the present invention relates to a stator for such a rotary electric motor.

The rotary electric motor of the above-described kind has already been proposed as disclosed in Japanese Patent Provisional Publication No. 2001-78408 whose applicant is the same as the assignee of this application.

SUMMARY OF THE INVENTION

By various examinations and investigations conducted by the applicants, it was revealed that the rotary electric motor disclosed by the above-described publication was still not perfect and had some room for improvement. Namely, in the rotary electric motor, a composite current is supplied to polyphase coils for controlling the rotating actions of an inner rotor and an outer rotor independently. The coils are thus required to be electrically separated from each other. To this end, as shown in FIG. 10, each stator piece 133 on which a coil 137 is wound is required to be electrically separated from other stator pieces 133 on which respective coils 37 are wound.

For this reason, if brackets 139, 141 for fixedly holding stator cores 135 therebetween and fixing bolts 113 are formed so as to constitute firm metallic members so that the stator cores are firmly held between brackets 139, 141, a rectangular current path is formed through a case (not shown), brackets 139, 141 and fixing bolts 113 so as to surround each stator piece 133 as shown in FIG. 11.

In the meantime, even if bolt holes formed in brackets 139, 141 are made larger in diameter than fixing bolt 113 so that a clearance is provided between the bolt hole and fixing bolt 113 as shown in FIG. 12, the above-described current path is still formed since the head of fixing bolt 113 disposed on the bracket 141 side is brought into contact with bracket 141.

When a closed-loop current path is formed in the above-described manner around each stator piece 133, an induction current $i_f$ flows, as shown in FIG. 11, due to a variation of magnetic flux resulting from a composite current $i_c$ supplied to each coil 134 and flowing through each stator piece 133. This causes the rotary electric motor to heat up and lower in the performance and efficiency.

Further, since each stator piece 133 is required to be produced independently, a variation in the thickness of laminated steel sheets constituting stator piece 133, i.e., a variation in the axial size of stator piece 133 is liable to occur. As a result, if bracket 141 is rigid and extends over all stator pieces 133, and stator pieces 133 are first position in place on bracket 139 and then held between brackets 139, 141 by using fixing bolts 113, there can possibly be formed spaces or clearances between stator piece 133 and bracket 141 due to a variation in the axial size of stator pieces 133 as exaggeratedly shown in FIG. 13. Thus, some stator pieces 133 may possibly be not firmly held between brackets 139, 141. Such stator pieces 133 cannot successfully support the torque that is caused in coils 137 wound around stator pieces 133.

To solve such a problem and allow each stator piece 133 to successfully support the torque caused in each coil 137, it is required that an error in the axial size of each stator piece 133 be held below a predetermined value and an axial force with which stator pieces 133 are held between brackets 139, 141 causes a sufficiently large frictional force between each stator piece 133 and bracket 141. To this end, adjustment of the axial size of each stator piece 133 by using shims or by secondary machining is necessitated, thus lowering the assembling efficiency of stator 107 and increasing the cost.

It is accordingly an object of the present invention to provide a rotary electric motor that can suppress induction current efficiently and can improve the performance and efficiency of the rotary electric motor.

It is a further object of the present invention to provide a rotary electric motor of the foregoing character that can be assembled with ease and efficiency and be manufactured at low cost.

To achieve the above object, there is provided according to an aspect of the present invention a rotary electric motor comprising an annular first rotor, an annular stator disposed concentric with and radially outside the first rotor, and an annular second rotor disposed concentric with and radially outside the stator, the stator including a stator core made up of a plurality of stator pieces that are arranged in a circular array and electrically independently from each other, coils wound around the respective stator pieces, annular first and second brackets disposed on opposite axial ends of the stator core, a fastening device passing through holes of the first and second brackets and fixedly holding the stator core between the first and second brackets, and an induction current suppressing device suppressing an induction current that is produced in response to a variation of magnetic flux of each of the coils and flows through the fastening device.

According to another aspect of the present invention there is provided a rotor for a rotary electric motor comprising a stator core having a plurality of stator pieces arranged in a circular array and electrically independently from each other, coils wound around the respective stator piece, annular first and second brackets disposed on opposite axial ends of the stator core, fastening means for fixedly holding the stator core between the first and second brackets, and suppressing means for suppressing an induction current that is produced in response to a variation of magnetic flux of each of the coils and flows through the fastening device.

BRIEF DESCRIPTION OF THE DRAWINGS

FIG. 8A is a schematic, partially developed, side elevational view of a stator of a rotary electric motor according to a sixth embodiment of the present invention;

FIG. 8B is a sectional view taken along the line 8B—8B of FIG. 8A;

DETAILED DESCRIPTION OF THE INVENTION

Figure 1:
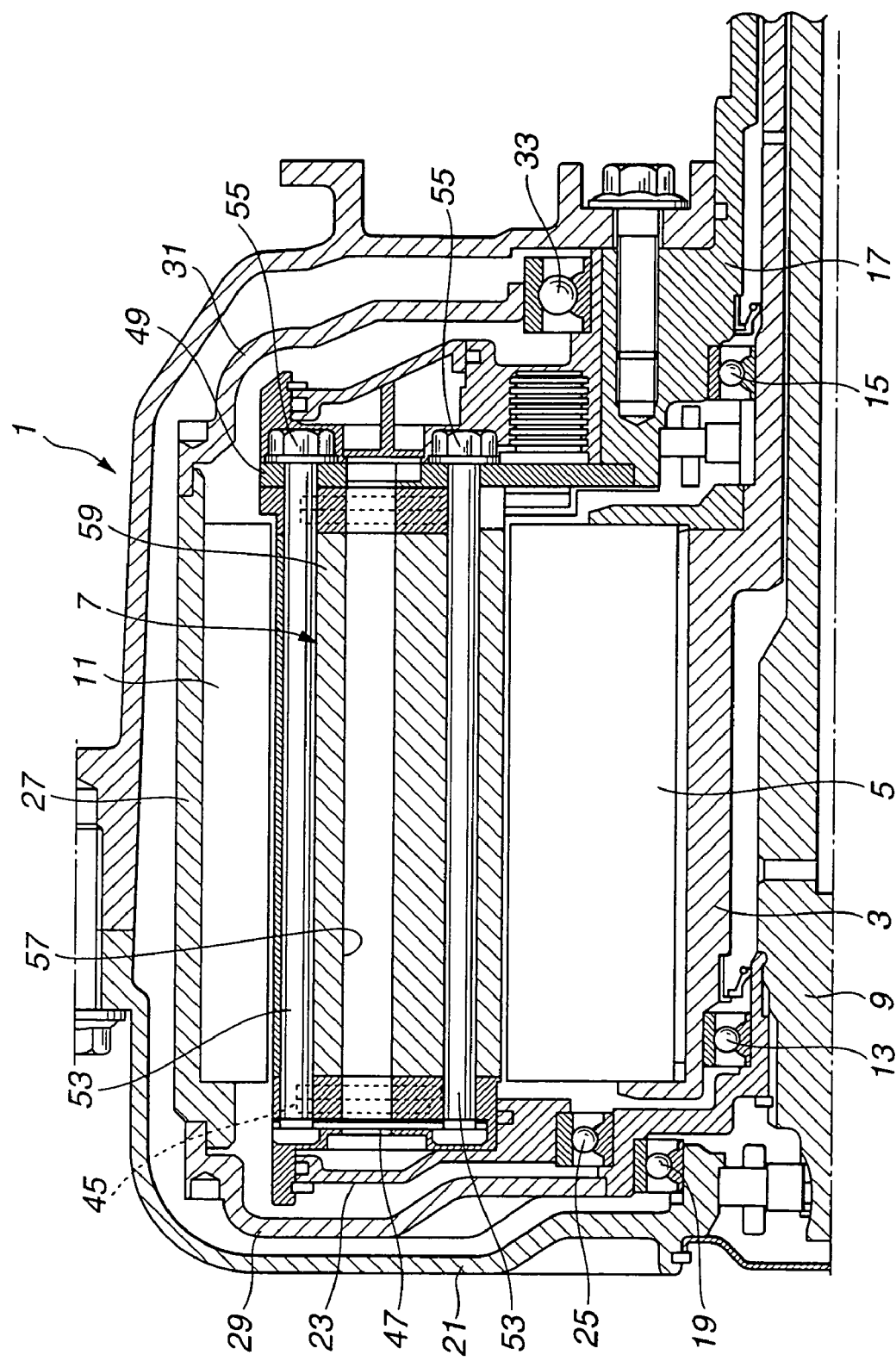
FIG. 1 a sectional view of an important portion of a rotary electric motor according to a first embodiment of the present invention.

Referring first to FIG. 1, a rotary electric motor is generally indicated by 1 and includes annular inner rotor 5 disposed concentric with and drivingly connected to first rotation shaft 3, annular stator 7 disposed concentric with and radially outside inner rotor 5 and annular outer rotor 11 drivingly connected to second rotation shaft 9 and disposed concentric with and radially outside stator 7. Namely, inner rotor 7, stator 7 and outer rotor 11 are disposed coaxially or concentrically so as to constitute a triple structure. In this embodiment, first and second rotation shafts 3, 9 are disposed concentrically in such a manner that first rotation shaft 3 is disposed radially outside second rotation shaft 9, i.e., first rotation shaft 3 surrounds second rotation shaft 9.

First rotation shaft 3 is relatively rotatably supported at one end portion thereof upon second rotation shaft 9 by way of bearing 13 and at the other end portion thereof upon stator shaft 17 by way of bearing 15. Second rotation shaft 9 is rotatably supported at one end portion thereof upon motor rear case 21 by way of bearing 19 and at the other end portion thereof upon a stationary member (not shown) connected to stator shaft 17 by way of a bearing (not shown). Second shaft 9 is thus relatively rotatably supported upon first shaft 3.

Stator 7 is supported at one end portion thereof upon second rotation shaft 9 by way of rear plate 23 and bearing 25 and fixedly attached at the other end portion thereof to stator shaft 17.

Outer rotor 11 is attached to rotor case 27 so as to be protected thereby. Rotor case 27 is drivingly connected at one end portion thereof to second rotation shaft 9 by way of rear plate 29 and rotatably supported at the other end portion thereof upon stator shaft 17 by way of front plate 31 and bearing 33.

Figure 2:
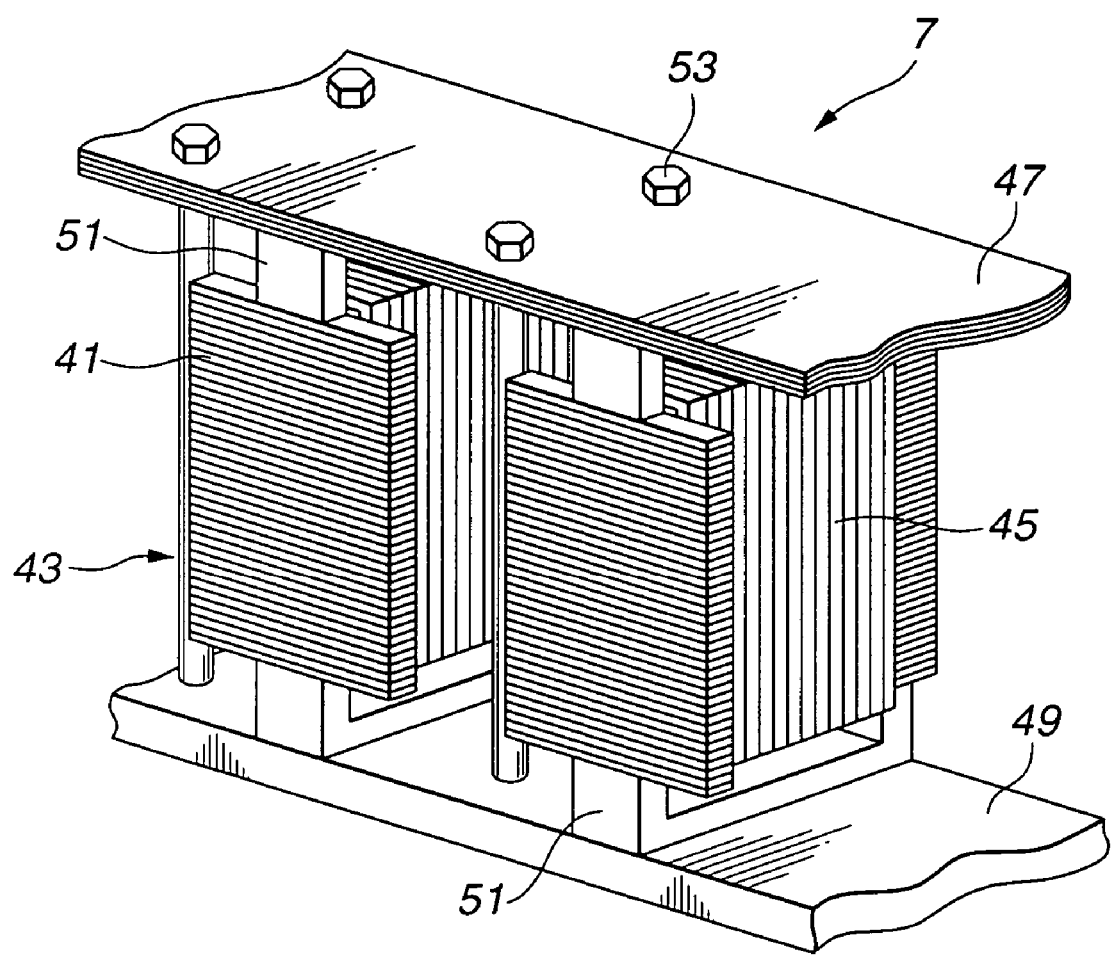
FIG. 2 is a schematic, partially developed, perspective view of a stator of the rotary electric motor of FIG. 1.

As shown in FIG. 2, stator 7 includes stator core 43 made up of a plurality of axially elongated stator pieces 41 that are arranged circumferentially, i.e., in a circular array with equal intervals, coils 45 wound around respective stator pieces 45 and a pair of annular brackets 47, 49 disposed on the axially opposite sides of stator core 43.

In this embodiment, one bracket, e.g., first bracket 47 is formed from laminated steel sheets each having an electrically insulating surface. Between bracket 47 and one end of each stator piece 41 is disposed U-shaped collar 51 formed from an electrically insulating material or metal (e.g., stainless steel) having a high strength and rigidity and shaped so as to keep away from coil 45. Further, the other bracket, e.g., second bracket 49 is made of metal having a high strength and rigidity. Between bracket 49 and the other end of each stator piece 41 is similarly disposed U-shaped collar 51 shaped so as to keep away from coil 45.

Figure 3:
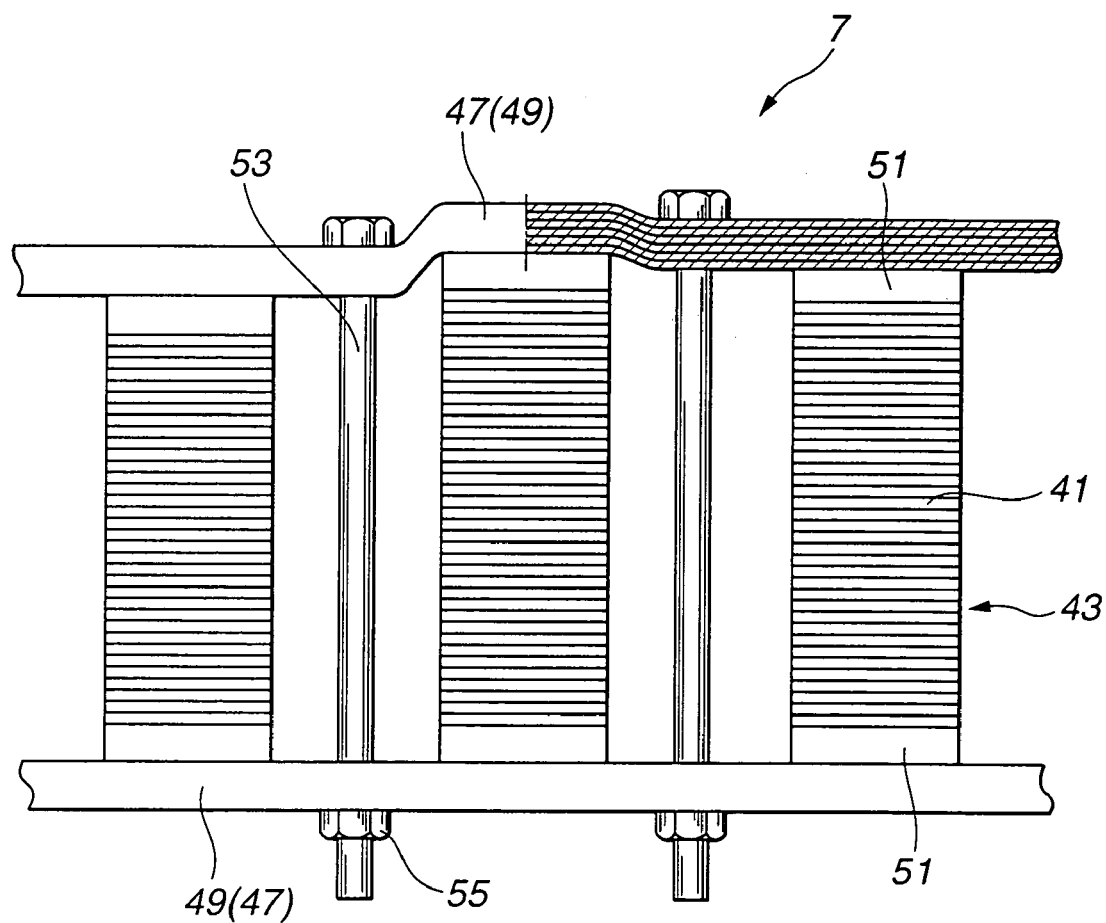
FIG. 3 is a schematic, partially developed, side elevational view of the stator of the rotary electric motor of FIG. 1.
Figure 4:
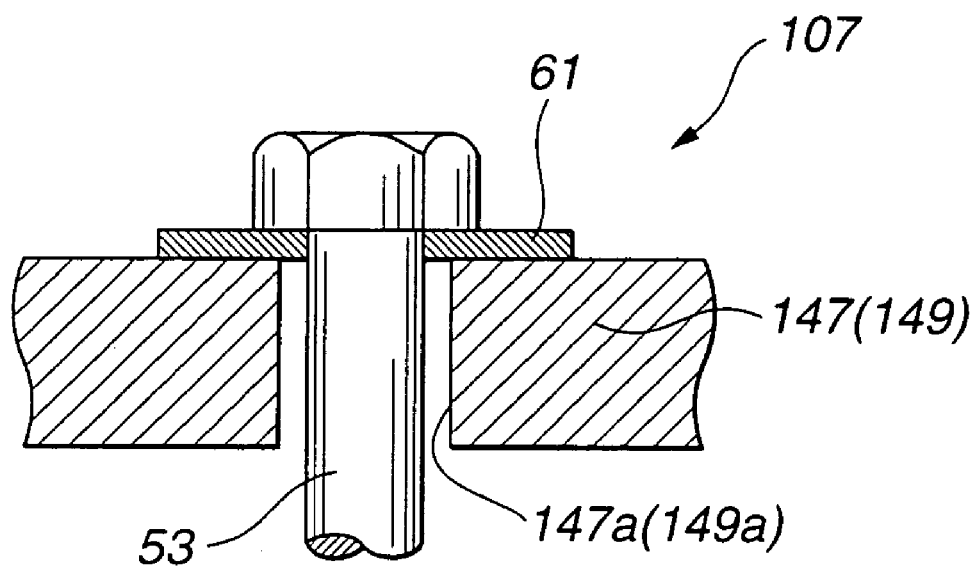
FIG. 4 is a schematic sectional view of an important portion of a stator of a rotary electric motor according to a second embodiment of the present invention.

With additional reference to FIGS. 3 and 4, inclusive, brackets 47, 49 are respectively formed with, at locations between adjacent two stator pieces 41, two bolt holes 47a, 49a that are spaced radially from each other. Inserted into respective bolt holes 47a, 49a from the bracket 47 side are fixing bolts 53 that constitute a fastening means or device. Nuts 55 are screwed onto respective axial end portions of fixing bolts 53 that protrude from bracket 49 and tightened, thereby fixedly holding stator core 43 between brackets 47, 49 by way of collars 51.

After assembly of stator 7, a mass of resin 59 is filled in a space between adjacent stator pieces 41 in a way as to form cooling medium passage 57 and solidified.

In this embodiment, an induction current suppressing means or device is constituted by bracket 47 that is formed from laminated steel sheets each having an electrically insulating surface. Namely, bracket 47 can assuredly shut off the induction current path around each stator piece 41. Accordingly, even if a composite current flowing through each coil 45 is varied to cause a variation in magnetic flux flowing through corresponding stator piece 41, induction of current is suppressed, thus making it possible to prevent heating up of rotary electric motor 1 effectively and thereby improve the performance and efficiency of rotary electric motor 1.

Further, even if the insulation of bolt-attaching portions of bracket 47 (i.e., surface portions of bracket 47 on which fixing bolts are seated) is broken, a large insulation resistance can still be obtained by the remaining steel sheets each having an insulation surface, thus making it possible to maintain the performance and efficiency of rotary electric motor 1 stably over an elongated period of usage and making it possible to assemble stator 7 with ease and without attention to damage or breakage of the insulating coating at the bolt-seating surface portions of the steel sheet due to rubbing or the like caused by tightening of fixing bolt 53.

Further, by forming bracket 47 from laminated steel sheets, the bending rigidity of bracket 47 is lowered, thus making it possible, as shown in FIG. 3, to absorb a dimensional error of each stator piece 41 that is formed from laminated steel sheets and hold stator core 43 between brackets 47, 49 assuredly.

FIG. 4 shows an important portion of stator 107 according to a second embodiment. This embodiment differs from the first embodiment in that bracket 147 is made of metal having a high strength and rigidity similarly to bracket 149, and insulating washer 61 is provided to each bolt-attaching portion of one of or both of brackets 147, 149, i.e., insulating washer 61 is disposed between a head of each fixing bolt 53 and bracket 147 or 149 and/or between a nut (no shown) screwed onto each fixing bolt 53 and bracket 149 or 148, and a clearance is provided between each fixing bolt 53 and each bolt hole 147a or 149a.

In this connection, insulating washer 61 can be formed from a single sheet of electrically insulating material or laminated steel sheets each having an electrically insulating surface.

By disposing insulating washer 61 at the fixing bolt 53 attaching portion of one of or each of brackets 147, 149 and thereby constituting the induction current suppressing means or device, it becomes possible to shut off the induction current path around each stator piece 41 assuredly by means of electrically insulating washer 61. Accordingly, by a simple structure, it becomes possible to prevent heating up of rotary electric motor 1 and thereby improve the performance and efficiency thereof. Particularly, in case insulating washer 61 is made of laminated steel sheets each having an electrically insulating surface, induction of current can be suppressed assuredly for a long period of usage. This is because, even if the insulation of the bolt-seating surface portion of insulating washer 61 is damaged or broken, a large insulation resistance can still be attained by the remaining steel sheets. Further, stator 7 can be assembled with ease without attention to breakage or damage of the insulating coating of the bolt-seating surface portion of insulating washer 61 due to rubbing or the like caused by tightening of fixing bolt 53.

Figure 5:
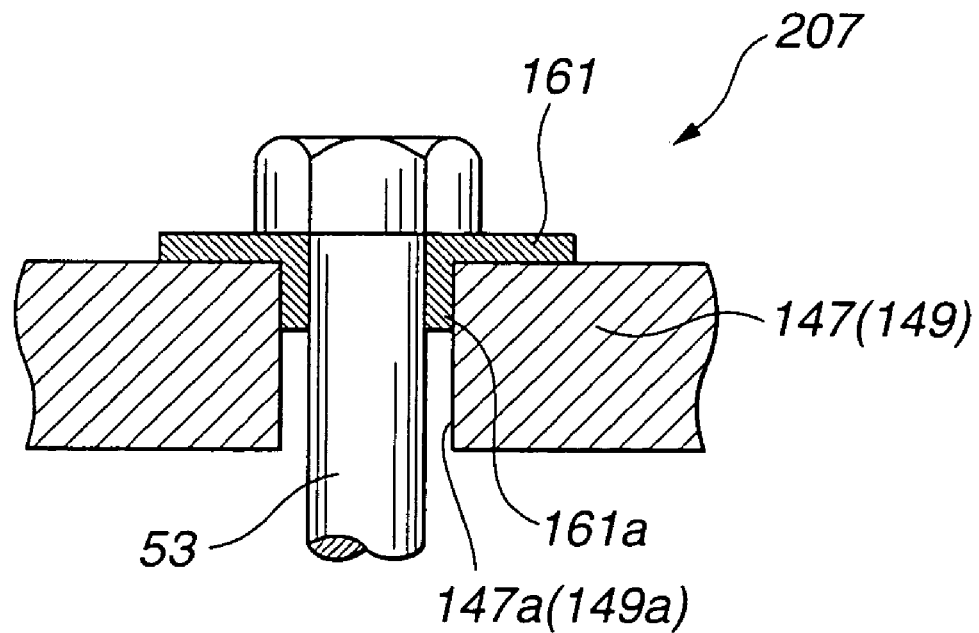
FIG. 5 is a schematic sectional view of an important portion of a stator of a rotary electric motor according to a third embodiment of the present invention.

FIG. 5 shows an important portion of stator 207 according to a third embodiment. This embodiment differs from the second embodiment in that insulating washer 61 has sleeve portion 61a that protrudes into bolt hole 147a or 149a.

By providing insulating washer 61 with sleeve portion 61a that protrudes into bolt hole 147a or 149a, it becomes possible to obtain a clearance between fixing bolt 53 and bracket 147 or bracket 149 assuredly, thus making it possible to shut off the induction current path assuredly even if fixing bolt 53 and brackets 147, 149 are conductive and thereby prevent heating up of rotary electric motor 1 and improve the performance and the efficiency thereof.

Figure 6:
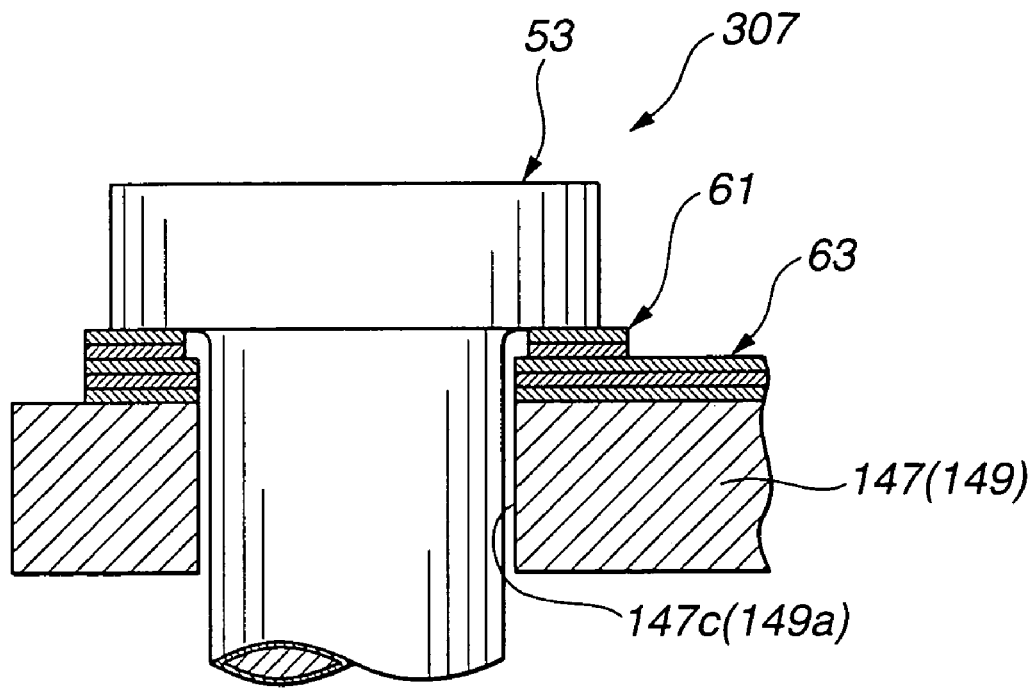
FIG. 6 is a schematic sectional view of an important portion of a stator of a rotary electric motor according to a fourth embodiment of the present invention.

FIG. 6 shows an important portion of stator 307 according to a fourth embodiment. This embodiment differs from the second embodiment in that between electrically insulating washer 61 on the bracket 147 side and bracket 147 is interposed electrically insulating plate washer 63 that is formed with a bolt hole through which fixing bolt 53 passes, so as to constitute the induction current suppressing means or device by means of insulating washer 61 and insulating plate washer 63.

Insulating washer 61 is made of a single sheet of electrically insulating material or a single magnetic steel sheet having an electrically insulating surface or laminated steel sheets formed by laminating such magnetic steel sheets. Further, insulating plate washer 63 is made of the same material as insulating washer 61 and is disposed on bracket 147 so as to cover all of the bolt-attaching portions.

By interposing, in the above-described manner, insulating washer plate 63 between insulating washer 61 and bracket 147, it becomes possible to shut off the induction current path around each stator piece 41 assuredly and therefore it becomes possible to improve the performance and the efficiency of rotary electric motor 1. Particularly, in case insulating washer 61 is formed from a single magnetic steel sheet or laminated steel sheets and insulating plate washer 63 is formed from laminated steel sheets, induction of current can be suppressed assuredly for a long period of usage. This is because, even if the insulation of the bolt-seating surface portion of the steel sheet is broken, a large insulation resistance can be maintained by the remaining steel sheets. Further, stator 307 can be assembled with ease without attention to breakage of the insulating coating of the bolt-seating surface portion of the steel sheet due to rubbing or the like caused by tightening of fixing bolt 53.

Figure 7:
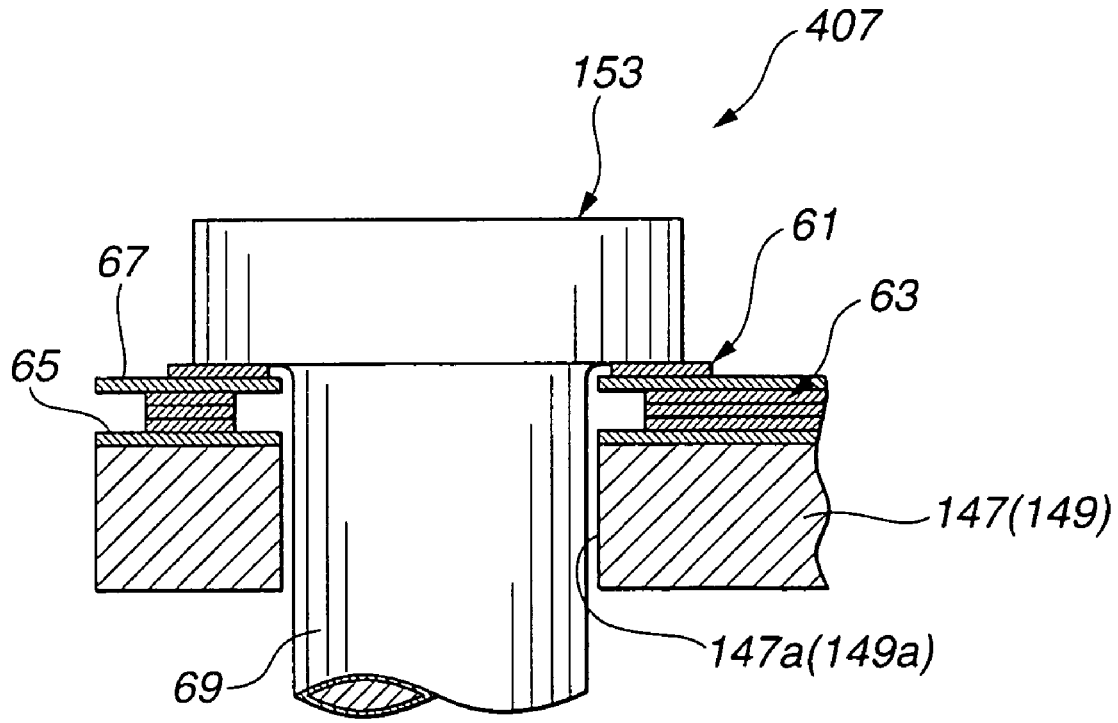
FIG. 7 is a schematic sectional view of an important portion of a stator of a rotary electric motor according to a fifth embodiment of the present invention.

FIG. 7 shows an important portion of stator 407 according to a fifth embodiment. This embodiment differs from the fourth embodiment in that first electrically insulating gasket plate 65 is disposed between bracket 147 and electrically insulating plate washer 63, second electrically insulating gasket washer 67 is disposed between electrically insulating plate washer 63 and electrically insulating washer 61 and the outer surface of fixing bolt 153 is covered by electrically insulating coating 69 so that insulating washer 61, first insulating gasket washer 65, insulating plate washer 63, second insulating gasket washer 67 and insulating coating 69 constitute the induction current suppressing means or device.

First and second insulating gasket washer 65, 67 are respectively disposed on bracket 147 and insulating plate washer 63 so as to cover all of the bolt-attaching portions of bracket 147. Further, first insulating gasket plate 65, insulating plate washer 63, second insulating plate washer 67 and insulating washer 61 have stepped outer peripheries around each bolt hole 147a and stepped bolt holes through which each fixing bolt 53 passes.

More specifically, first and second insulating gasket washers 65, 67 are made larger in radial and circumferential extension around each bolt hole 147a than insulating plate washer 63. The bolt holes of first and second insulating gasket washers 65, 67 are made nearly equal in diameter to the bolt holes of bracket 147. The bolt holes of insulating plate washer 63 is larger in diameter than bolt holes 147a of bracket 147.

First insulating gasket plate 65, insulating plate washer 63, second insulating plate washer 67 and insulating washer 61 thus have outer peripheries that are stepped between insulating washer 61 and second insulating gasket washer 67, between second insulating gasket washer 67 and insulating plate washer 63 and between insulating plate washer 63 and first insulating gasket washer 65 around each bolt hole 147a, respectively and also have bolt holes that are stepped between adjacent two of the bolt holes.

In this embodiment, first and second insulating gasket washers 65, 67 are additionally provided to the upper and lower sides of insulating plate washer 63 and insulating coating 69 is applied to the outer surface of fixing bolt 53. Thus, this embodiment can attain the more assured electrical insulation between the head of each fixing bolt 53 and bracket 147 as compared with that of the fourth embodiment. Accordingly, the induction current path around each stator piece 41 can be shut off more assuredly, thus making it possible to improve the performance and efficiency of rotary electric motor 1 more assuredly.

Further, since first insulating gasket plate 65, insulating plate washer 63, second insulating plate washer 67 and insulating washer 61 have outer peripheries that are stepped around each bolt hole 147a and also have bolt holes that are stepped between adjacent two of the bolt holes, it becomes possible to obtain a sufficient creeping distance between the head of fixing bolt 53 and bracket 147. Accordingly, in case insulating washer 61 and insulating plate washer 63 is made of a single magnetic steel sheet or laminated steel sheets each having an insulating surface, it never occurs that the outer peripheral surfaces of insulating washer 61 and insulating plate washer 63 that are not insulated become flush with each other, thus making it possible to provide an assured insulation between each fixing bolt 53 and bracket 47.

FIGS. 8A and 8B show an important portion of stator 507 according to a sixth embodiment. This embodiment differs from the fifth embodiment in that bracket 247 is divided into a plurality of bracket pieces 71 each extending between adjacent two of stator pieces 41.

Each bracket piece 71 is recessed or U-shaped in cross section at least at the opposite end portions thereof so as to keep away from coils 45. Further, each stator bracket 71 has at the opposite end portions thereof ribs 73 projecting toward the stator piece 41 side. Ribs 73 at the opposite end portions are abutted upon the end surfaces of adjacent two of stator pieces 41. Adjacent two of stator pieces 41 are held between bracket piece 71 and bracket 149 by means of fixing bolt 53. The other structure is substantially the same as that of the fifth embodiment so that like parts and portions to those of the fifth embodiment are designated by like references characters and repeated description thereof is omitted for brevity.

In this embodiment, bracket 247 is divided into a plurality of bracket pieces 71 each extending between adjacent two of stator pieces 41. Thus, if there is, due to a dimensional error, a difference in the axial size between adjacent two stator pieces 41, bracket piece 71 extending between adjacent two stator pieces 41 is inclined as shown in FIG. 8A. Furthermore, since each bracket piece 71 has at the opposite end portions thereof ribs 73 projecting toward the stator piece 41 side, it can be always held at the same place relative to adjacent two stator pieces 41 and transmit an axial force even if inclined due to a difference in the axial size between adjacent two stator pieces 41. Accordingly, stator cores 43 can be held in a stable state between brackets 247, 149 assuredly without being influenced by a dimensional error in the axial size of stator pieces 41. Thus, the required dimensional accuracy of stator piece 41 can be lowered, and therefore adjustment for compensating for the dimensional error by using shims or by secondary machining is not necessitated, thus making it possible to assemble stator 7 with an improved efficiency and reduce the cost.

Figure 9:
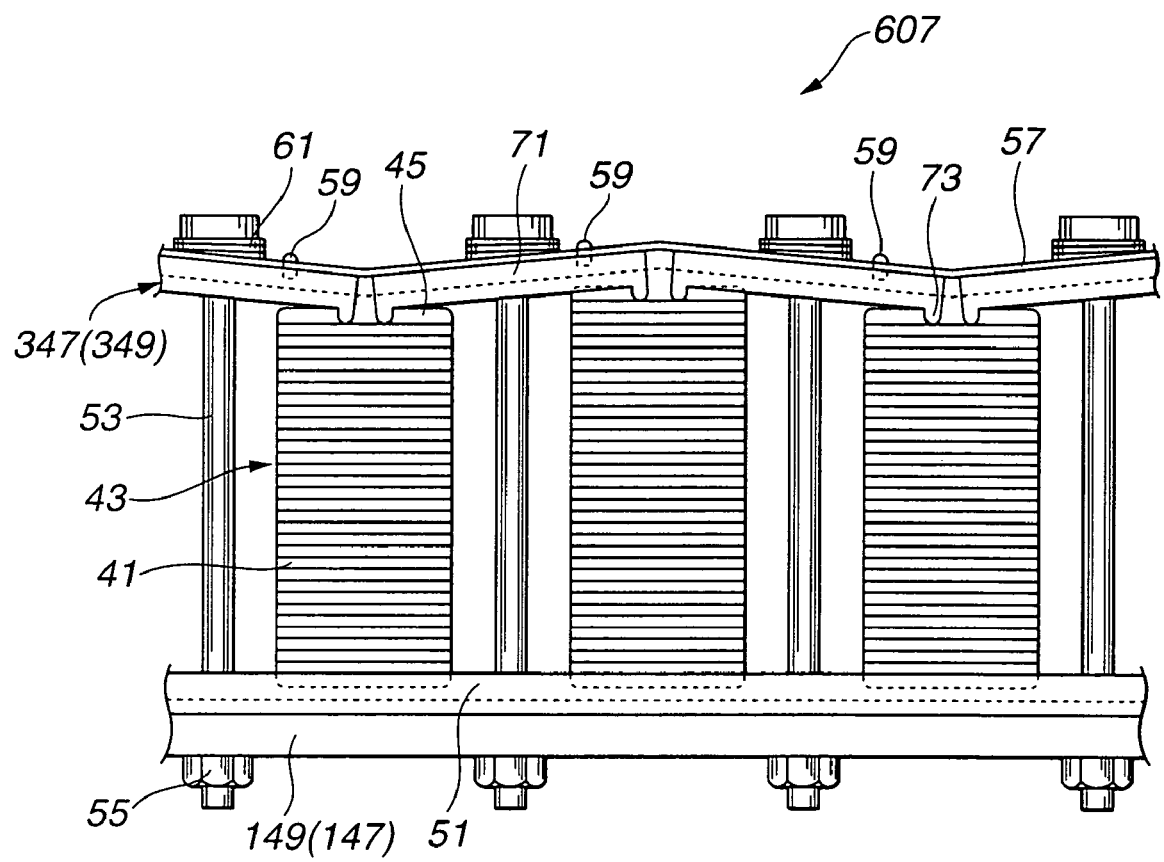
FIG. 9 is a view similar to FIG. 8A but shows a seventh embodiment of the present invention.
Figure 10:
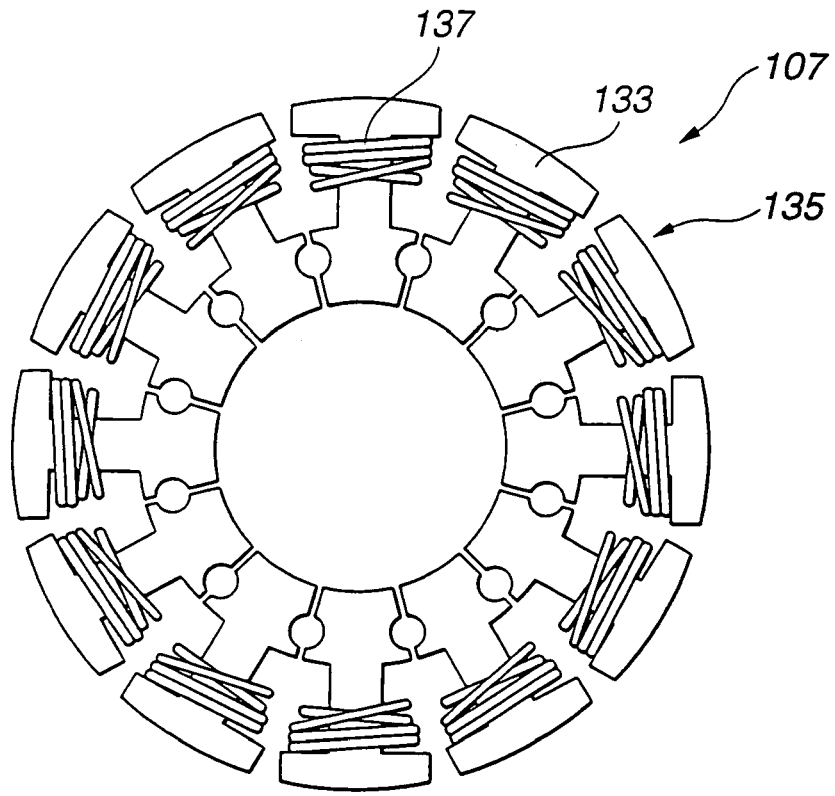
FIG. 10 is a schematic view showing an arrangement of stator pieces of a stator according to an earlier technology.
Figure 11:
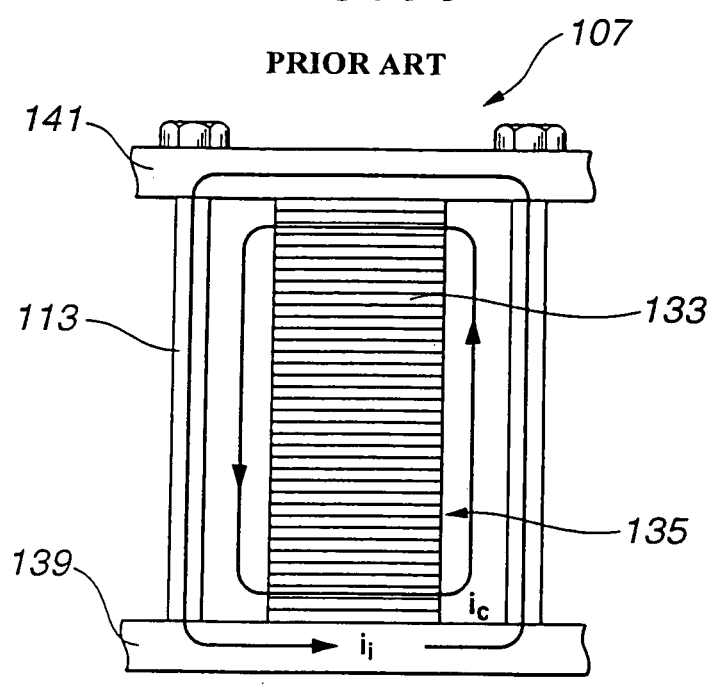
FIG. 11 is a schematic, partially developed view of the stator of FIG. 10.
Figure 12:
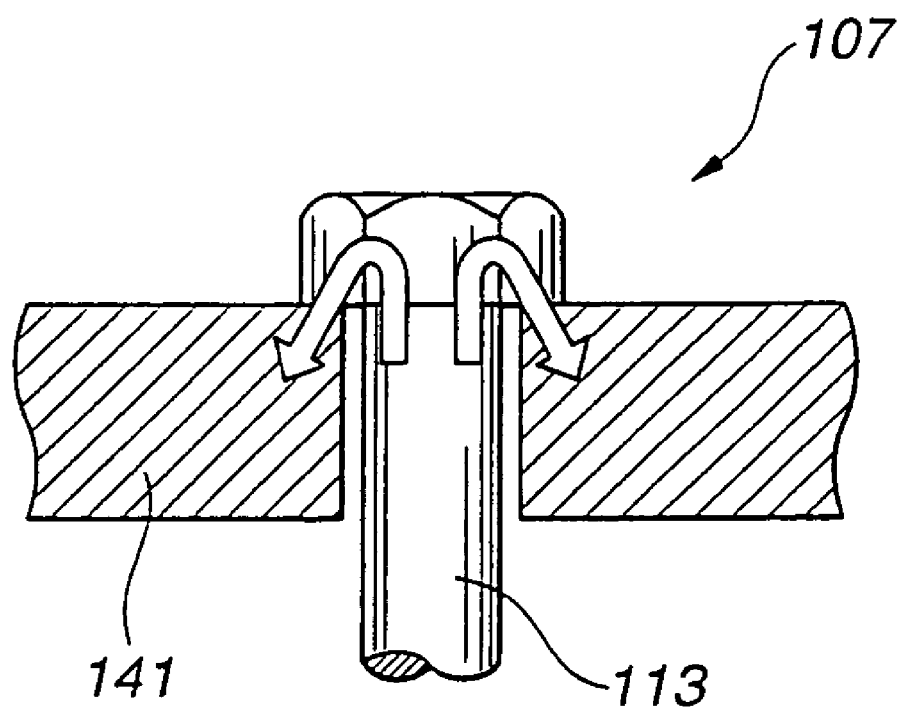
FIG. 12 is a view for illustrating how a closed-loop current path is formed in the stator of FIG. 10.
Figure 13:
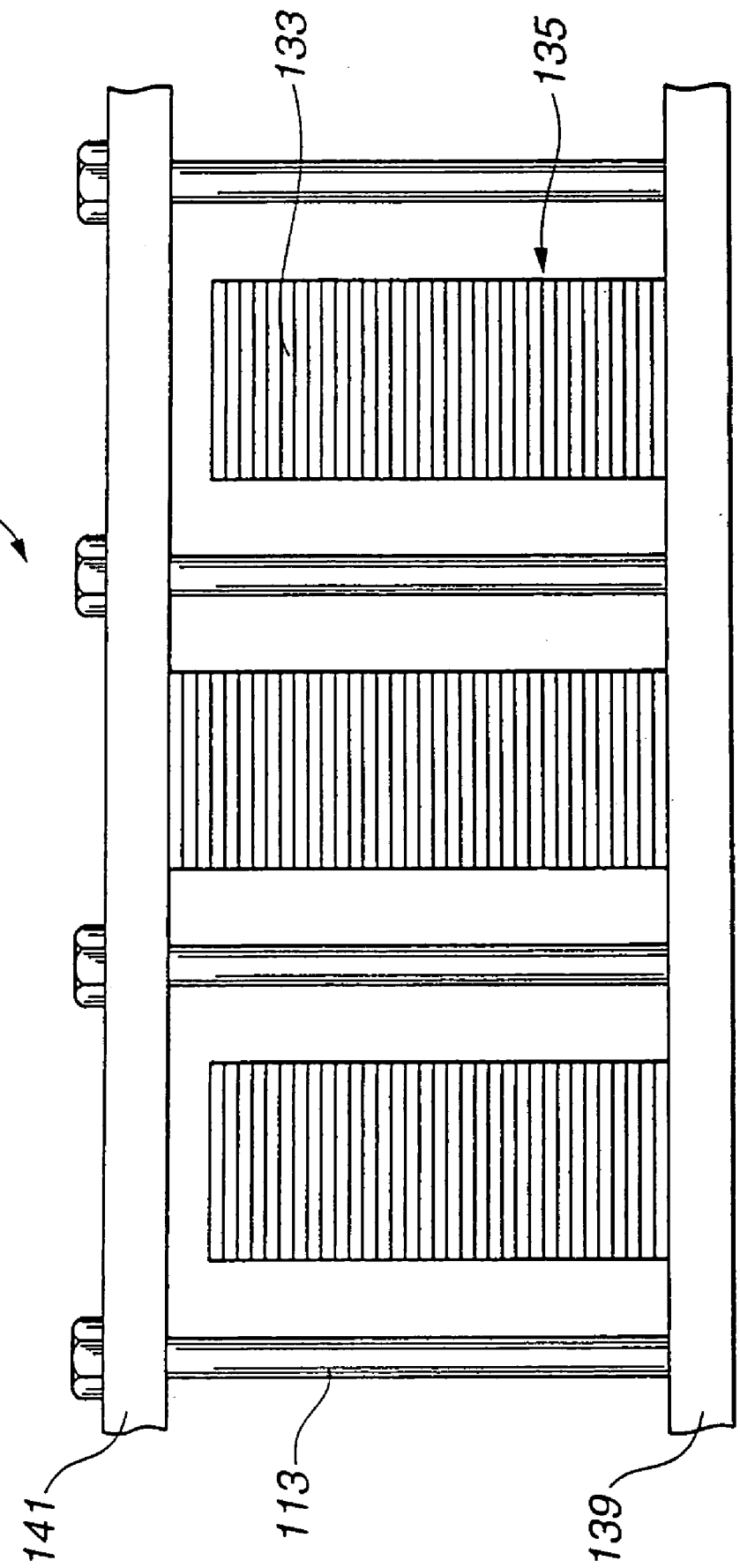
FIG. 13 is a schematic, partially developed view of the stator of FIG. 10.

FIG. 9 shows an important portion of stator 607 according to a seventh embodiment. This embodiment differs from the sixth embodiment in that each bracket piece 71 of bracket 347 has a pair of positioning pins 59 that are spaced apart radially (though only one is shown) and attached to ring-shaped end plate 57 having positioning holes (no numeral) while being positioned in place by inserting positioning pins 59 into the positioning holes. End plate 57 is formed from a steel sheet having an insulating surface and is flexible or deformable axially thereof. Since bracket pieces 71 are attached to common end plate 57 while being positioned in place by means of positioning pins 59, they can be positioned with respect to respective stator pieces 41 more easily. Furthermore, bracket pieces 71 and end plate 57 are joined to constitute a single unit that can be handled with ease, thus making it possible to assemble stator 607 with an improved efficiency.

Except for the above, this embodiment is substantially similar to the sixth embodiment and can produce substantially the same effect.

The entire contents of Japanese Patent
Applications P2002-098257 (filed Apr. 1, 2002), P2002-098263 (filed Apr. 1, 2002), P2002-222606 (filed Jul. 31, 2002), and P2002-364058 (filed Dec. 16, 2002) are incorporated herein by reference.

Although the invention has been described above by reference to certain embodiments of the invention, the invention is not limited to the embodiment described above. Modifications and variations of the embodiment described above will occur to those skilled in the art, in light of the above teachings.

For example, while in the first embodiment bracket 47 is formed from laminated steel sheets each having an insulating surface, it can be made of any other insulating material such as ceramic, resin and rubber or titanium having a large resistivity or bracket 49 can be made of an insulating material in place of bracket 47 or both brackets 47, 49 can be made of an insulating material. Further, the induction current suppressing means or device can be easily constituted by electrically insulating fixing bolt 53 that is made an electrically insulating material such as ceramic, resin and rubber or titanium having a large resistivity or coated with an electrically insulating layer, or by a suitable combination of some of electrically insulating bracket 47 and/or electrically insulating bracket 49, electrically insulating washer 61, and electrically insulating fixing bolt 53.

Further, while in the above-described embodiments collars 51 are disposed on the opposite axial ends of each stator piece 41, they can be omitted so that each stator piece 41 is held directly between brackets 47, 49 by means of fixing bolt 53. Further, single fixing bolt 53 can be used between adjacent stator pieces 41 for holding stator core 43 between brackets 47, 49.

Further, in the fourth embodiment described with reference to FIG. 6, insulating washer 61 and insulating plate washer 63 can have stepped outer peripheries and stepped bolt holes around each fixing bolt 53 so as to attain a sufficient creeping distance between the head of fixing bolt 53 and bracket 47. In case insulating washer 61 and insulating plate washer 63 are made of laminated steel sheets, such a stepped outer periphery and bolt hole can be formed by changing the size and bolt hole diameter of at least one magnetic steel sheet constituting the laminated steel sheets. Further, insulating washer 61 and insulating plate washer 63 can be disposed on the bracket 149 side or on each of the bracket 147 side and bracket 149 side or fixing bolt 53 can be coated with an insulating layer similarly to the fifth embodiment described with reference to FIG. 7.

Further, while in the fifth embodiment first insulating gasket plate 65, insulating plate washer 63, second insulating plate washer 67 and insulating washer 61 have outer peripheries that are stepped between insulating washer 61 and second insulating gasket washer 67, between second insulating gasket washer 67 and insulating plate washer 63 and between insulating plate washer 63 and first insulating gasket washer 65 around each bolt hole 147a, respectively and also have bolt holes that are stepped between adjacent two of the bolt holes, it will suffice to make the outer circumferential peripheries and bolt holes be stepped at least at one place, respectively. Further, if insulating washer 61 and insulating plate washer 63 are made of laminated steel sheets, such stepped outer circumferential peripheries and stepped bolt holes can be formed by changing the size and bolt hole of at least one magnetic steel sheet constituting the laminated steel sheets. Further, in the fifth embodiment, insulating washer 61, insulating plate washer 63 and first and second insulating gasket washers 65, 67 can be formed on the bracket 149 side or on both the bracket 147 side and bracket 149 side, or the insulating coating of fixing bolt 53 can be omitted.

Further, in the sixth embodiment of FIGS. 8A and 8B, bracket 249 can be divided into a plurality of bracket pieces 71. The structure in which bracket 247 or 249 is divided into a plurality of bracket pieces 71 each extending between adjacent two of stator pieces 41 as in the sixth embodiment can be effectively used in the first to fifth embodiments.

Further, while in the above described embodiments, fixing bolt 53 is used as a fastening device for holding stator pieces 41 between brackets 47, 49, a rivet can be used in place of fixing bolt 53. Namely, each stator piece 41 can be held between brackets 47, 49 by inserting a rivet in a heated state into the corresponding holes of brackets 47, 49, forming a head at one end of the rivet by hammering and then cooling the rivet and thereby tightly holding stator piece 41 between brackets 47, 49.

The scope of the invention is defined with reference to the following claims.

The invention claimed is:

1. A rotary electric motor comprising:
an annular first rotor;
an annular stator disposed concentric with and radially outside the first rotor; and
an annular second rotor disposed concentric with and radially outside the stator;
the stator including a stator core made up of a plurality of stator pieces that are arranged in a circular array and electrically independently from each other, coils wound around the respective stator pieces, annular first and second brackets disposed on opposite axial ends of the stator core, a fastening device passing through holes of the first and second brackets and fixedly holding the stator core between the first and second brackets, and an induction current suppressing device suppressing an induction current that is produced in response to a variation of magnetic flux of each of the coils and flows through the fastening device;
wherein one of the first and second brackets is made of an electrically insulating material, and the induction current suppressing device comprises one of the first and second brackets; and
wherein one of the first and second brackets is formed from laminated steel sheets each having an electrically insulating surface.

2. A rotary electric motor comprising:
an annular first rotor;
an annular stator disposed concentric with and radially outside the first rotor; and
an annular second rotor disposed concentric with and radially outside the stator;
the stator including a stator core made up of a plurality of stator pieces that are arranged in a circular array and electrically independently from each other, coils wound around the respective stator pieces, annular first and second brackets disposed on opposite axial ends of the stator core, a fastening device passing through holes of the first and second brackets and fixedly holding the stator core between the first and second brackets, and an induction current suppressing device suppressing an induction current that is produced in response to a variation of magnetic flux of each of the coils and flows through the fastening device;
wherein the induction current suppressing device comprises a first electrically insulating gasket washer disposed on one of the first and second brackets, an electrically insulating plate washer disposed on the first insulating gasket washer, a second electrically insulating gasket washer disposed on the electrically insulating plate washer and an electrically insulating washer disposed on the second electrically insulating gasket washer and at a fastening device-attaching portion of one of the first and second brackets, and wherein the first electrically insulating gasket washer, the electrically insulating plate washer, the second electrically insulating gasket washer and the electrically insulating washer have stepped outer peripheries around each of the holes of said one of the first and second brackets and stepped holes through which the fastening device passes.

3. A rotary electric motor according to claim 2, wherein one of the first electrically insulating gasket washer, the electrically insulating plate washer, the second electrically insulating gasket washer and the electrically insulating washer is formed from laminated steel sheets each having an electrically insulating surface.

4. A rotary electric motor comprising:
an annular first rotor;
an annular stator disposed concentric with and radially outside the first rotor; and
an annular second rotor disposed concentric with and radially outside the stator;
the stator including a stator core made up of a plurality of stator pieces that are arranged in a circular array and electrically independently from each other, coils wound around the respective stator pieces, annular first and second brackets disposed on opposite axial ends of the stator core, a fastening device passing through holes of the first and second brackets and fixedly holding the stator core between the first and second brackets, and an induction current suppressing device suppressing an induction current that is produced in response to a variation of magnetic flux of each of the coils and flows through the fastening device;
wherein one of the first and second brackets is divided into a plurality of bracket pieces each extending between adjacent two of the stator pieces and having one of the holes.

5. A rotary electric motor according to claim 4, wherein each of the bracket pieces have at opposite ends thereof ribs that protrude toward adjacent two of the stator pieces, respectively.

6. A rotary electric motor according to claim 5, wherein the bracket pieces are attached to an annular insulating end plate having holes that correspond in position to the holes of one of the first and second brackets and allow the fastening device to pass therethrough.

7. A rotary electric motor according to claim 6, wherein the end plate and each of the bracket pieces have a positioning device for positioning each of the bracket pieces with respect to the insulating end plate.

8. A rotary electric motor comprising:
an annular first rotor;
an annular stator disposed concentric with and radially outside the first rotor; and
an annular second rotor disposed concentric with and radially outside the stator;
the stator including a stator core made up of a plurality of stator pieces that are arranged in a circular array and electrically independently from each other, coils wound around the respective stator pieces, annular first and second brackets disposed on opposite axial ends of the stator core, a fastening device passing through holes of the first and second brackets and fixedly holding the stator core between the first and second brackets, and an induction current suppressing device suppressing an induction current that is produced in response to a variation of magnetic flux of each of the coils and flows through the fastening device;
wherein one of the first and second brackets comprises a flexible body; and
wherein said one of the first and second brackets is made of laminated steel sheets each having an electrically insulating surface, and the induction current suppressing device comprises said one of the first and second brackets.

* * * * *